United States Patent
Fujita et al.

(10) Patent No.: US 7,210,730 B2
(45) Date of Patent: May 1, 2007

(54) MOUNTING STRUCTURE OF AUTOMOBILE DOOR

(75) Inventors: Yasuyuki Fujita, Hiroshima-ken (JP); Eiichi Baba, Hiroshima-ken (JP); Syuuji Raisu, Hiroshima-ken (JP)

(73) Assignee: Nishikawa Rubber Co., Ltd., Hiroshima-shi (JP)

( * ) Notice: Subject to any disclaimer, the term of this patent is extended or adjusted under 35 U.S.C. 154(b) by 214 days.

(21) Appl. No.: 10/997,243

(22) Filed: Nov. 22, 2004

(65) Prior Publication Data

US 2005/0189782 A1   Sep. 1, 2005

(30) Foreign Application Priority Data

Feb. 26, 2004 (JP) ............................. 2004-051019
Mar. 11, 2004 (JP) ............................. 2004-069298

(51) Int. Cl.
  *B62D 25/04* (2006.01)
(52) U.S. Cl. ..................... 296/146.5; 49/502
(58) Field of Classification Search ............ 296/146.1, 296/146.5, 146.9, 1.08; 49/475.1, 502
See application file for complete search history.

(56) References Cited

U.S. PATENT DOCUMENTS

| 5,651,578 | A | * | 7/1997 | Mistopoulos et al. | 296/146.9 |
| 6,039,384 | A | * | 3/2000 | Schulte et al. | 296/146.5 |
| 2004/0006923 | A1 | * | 1/2004 | Nakanishi et al. | 49/502 |
| 2005/0066584 | A1 | * | 3/2005 | Mounie et al. | 49/502 |
| 2005/0168009 | A1 | * | 8/2005 | Dry et al. | 296/146.5 |

* cited by examiner

*Primary Examiner*—Jason Morrow
(74) *Attorney, Agent, or Firm*—Flynn, Thiel, Boutell & Tanis, P.C.

(57) ABSTRACT

There is provided a mounting structure of an automobile, wherein a belt line outer weather strip and a center pillar garnish are mounted on a door panel via an end cap mechanism. The center pillar garnish comprises a concave groove in a lower end portion thereof. The concave groove opens in a down ward direction. The end cap mechanism comprises a roughly U-shaped gripping groove in an upper portion thereof and a clip portion in a lower portion thereof. The gripping groove of the end cap mechanism holds a cut upper end portion of the belt line outer weather strip and an upper concave groove portion of the center pillar garnish as well as an upper pass hole portion of the center pillar portion. The clip portion is inserted into a mounting hole of the door panel.

9 Claims, 9 Drawing Sheets

PRIOR ART

MOUNTING STRUCTURE OF AUTOMOBILE DOOR

BACKGROUND OF THE INVENTION

This invention relates to a mounting structure of a center pillar garnish, sash molding and belt line outer weather strip, mounted on a door body of an automobile.

Figure 1:
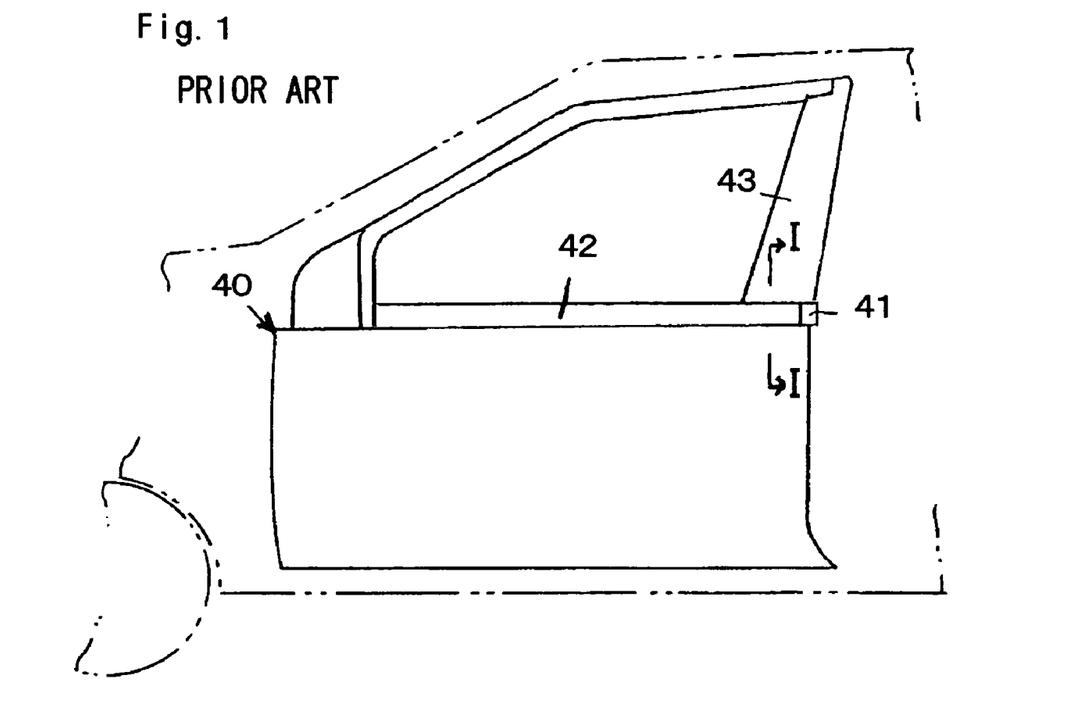
FIG. 1 is a side elevation view showing a prior art.
Figure 2:
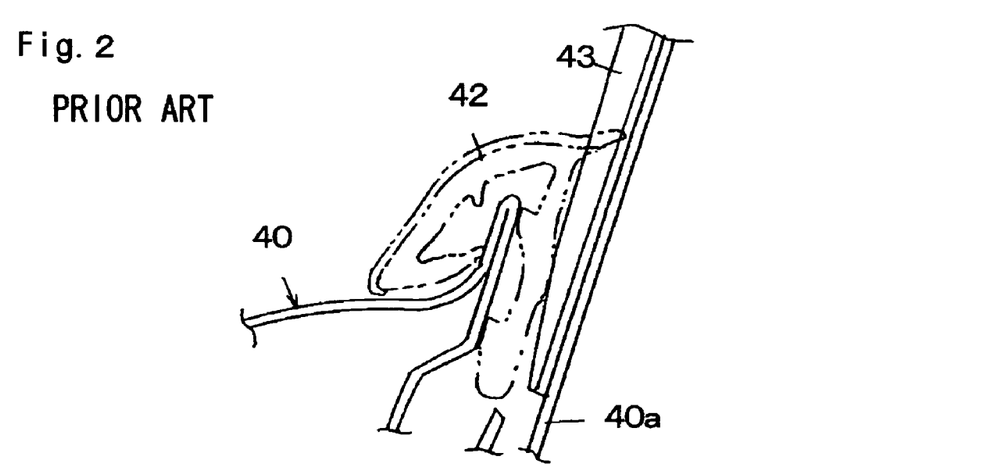
FIG. 2 is a section view along line I—I in FIG. 1.
Figure 3:
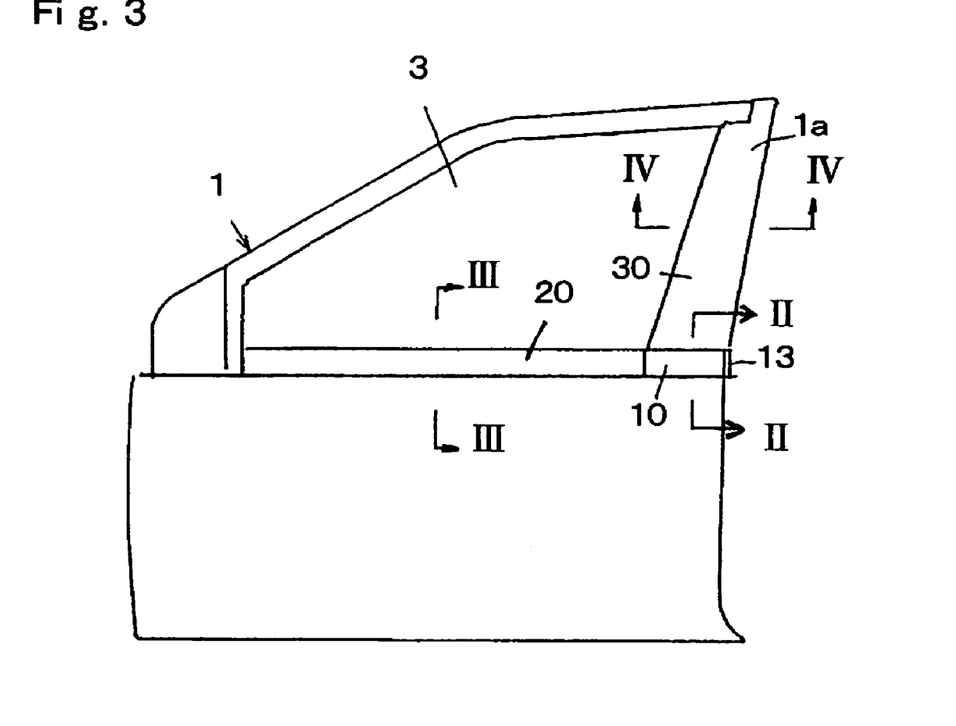
FIG. 3 is a side elevation view showing a preferred embodiment according to the invention.
Figure 4:
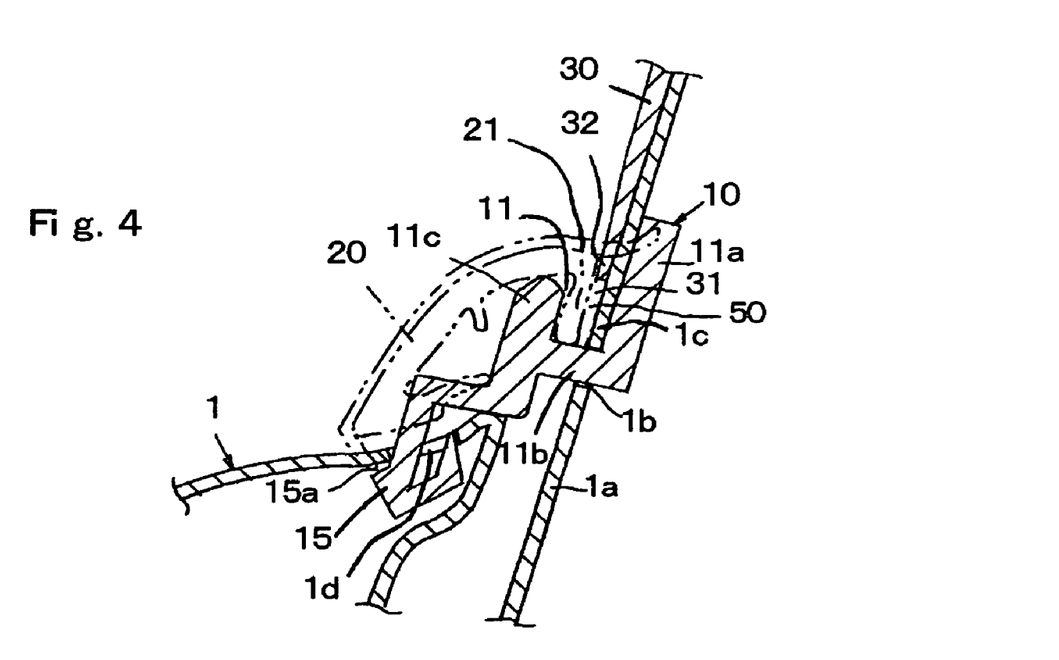
FIG. 4 is a section view along line II—II in FIG. 3.
Figure 5:
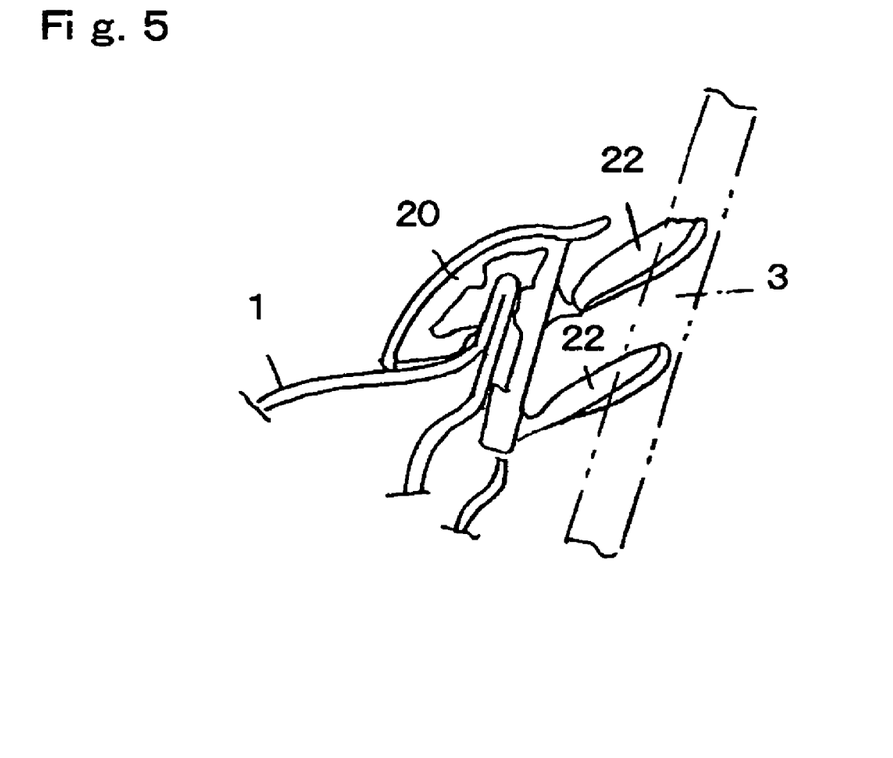
FIG. 5 is a section view along line III—III in FIG. 3.
Figure 6:
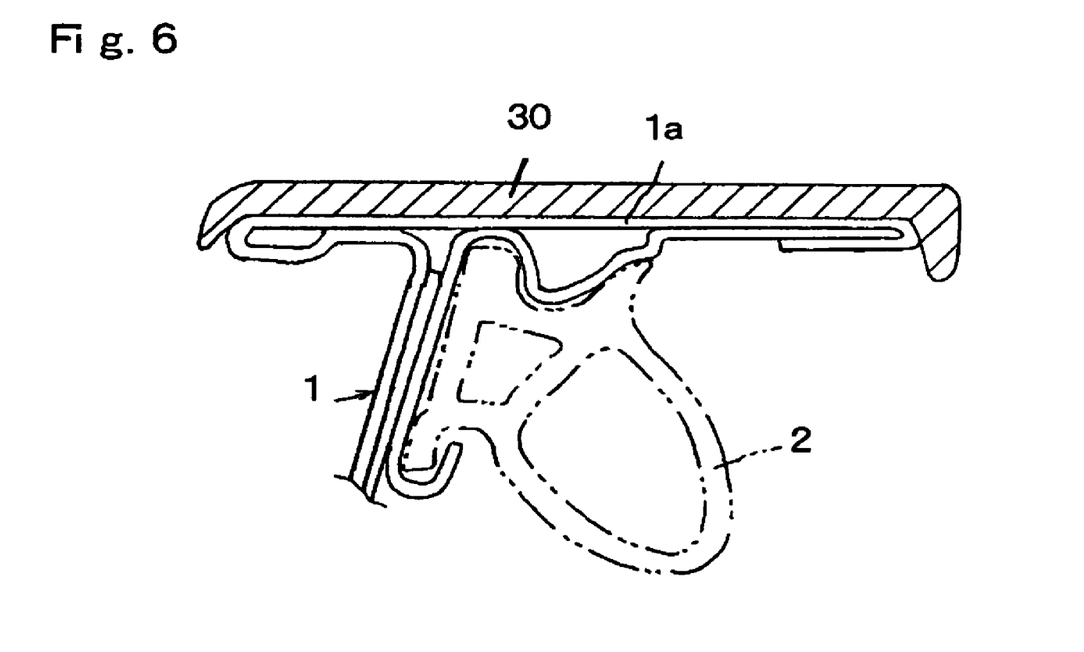
FIG. 6 is a section view along line IV—IV in FIG. 3.
Figure 7:
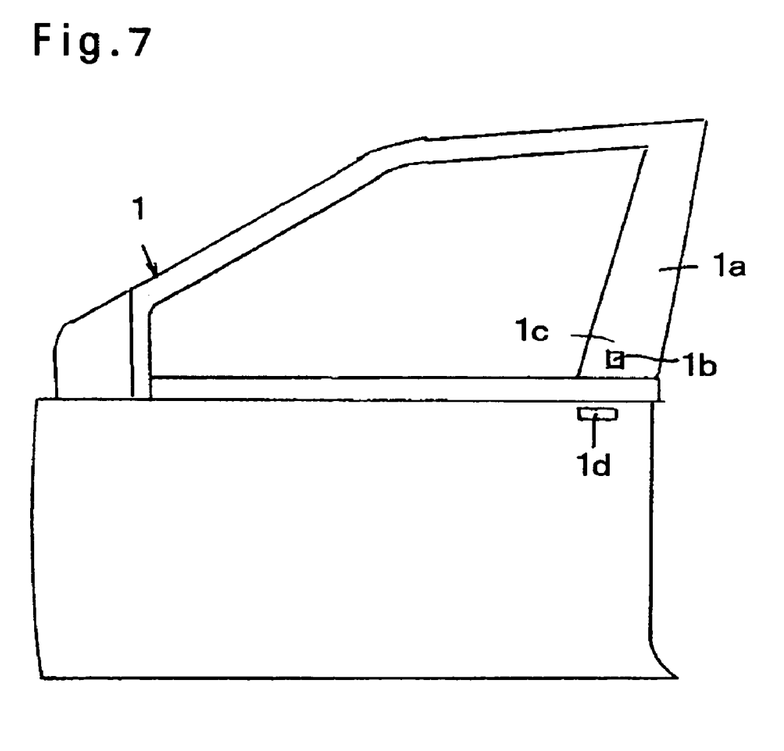
FIG. 7 is a side elevation view showing a door panel illustrated in FIG. 3.
Figure 8:
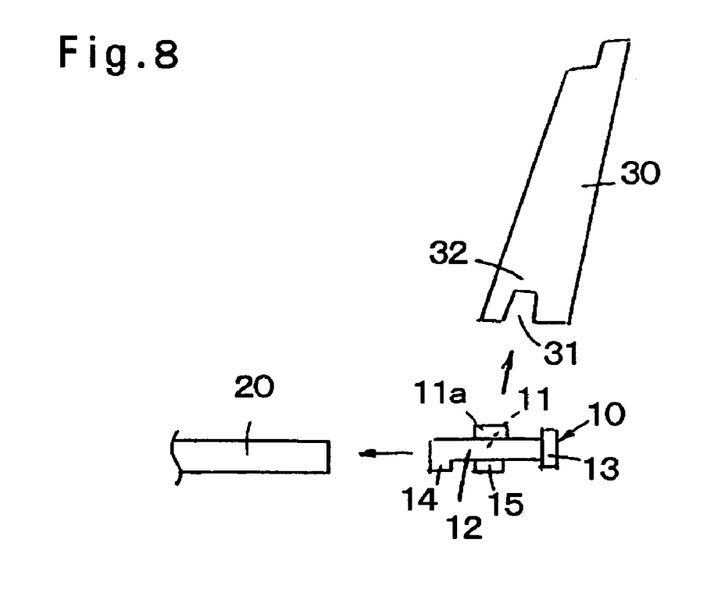
FIG. 8 is a side elevation view showing a belt line outer weather strip, a center pillar garnish and an end cap mechanism illustrated in FIG. 3.
Figure 9:
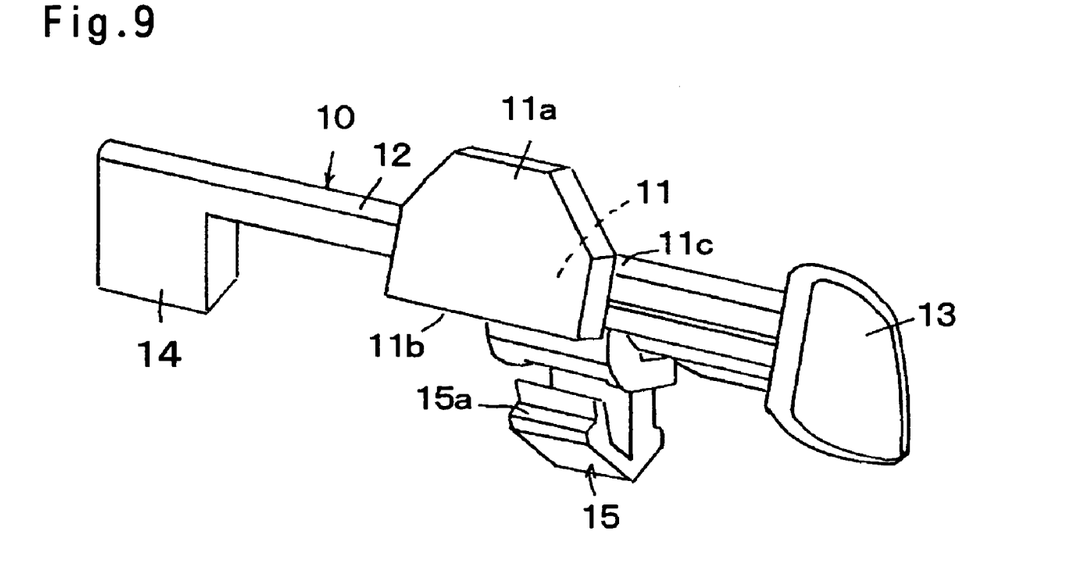
FIG. 9 is a perspective view showing an end cap mechanism.

A prior art will be described referring to FIGS. 1 and 2. Conventionally, there is provided an end cap 41 on a rear end of a belt line outer weather strip 42, which is installed to a front door panel 40 of an automobile, in consideration of an outlook.

In such conventional prior art, there is a problem in a close portion of the end cap 41, that is, a contacting portion between the belt line outer weather strip 42 and a center pillar garnish 43 installed to a center pillar portion 40a of a door panel 40 tends to move with each other because of a shrinkage and an expansion of resin materials which form those members, thus, deteriorating an outlook of the structure. Such problem arises because each member is molded individually, and after completion of installation, each member makes only a resilient contact with the other member while each member is unsecured to the door panel 40 (see FIG. 2).

Further, there has been a conventional structure wherein a lower end of a center pillar garnish (sash cover) is installed to a door panel with a clip. However, since the lower end of the sash cover is merely placed on the clip, there arises a displacement between them because of a shrinkage and an expansion of resin materials caused by a temperature variation. Further, there is another problem in this conventional structure that it cannot coordinate with any displacement developed in a mounting structure. (See, for example, Japanese Unexamined Patent Publication No. 11-291762.)

This invention is made in the light of above mentioned problems which the conventional structure has. It is therefore the first object of this invention to provide a mounting structure of an automobile door, particularly a mounting structure formed in a lower end of a center pillar portion, comprising a rear end of a belt line outer weather strip and a lower end of a center pillar garnish both installed to a door panel, whose appearance is not deteriorated by a shrinkage and an expansion of resin materials forming those members by a temperature variation, and which is able to cooperate with a displacement of structure if such a structure is developed.

Figure 10:
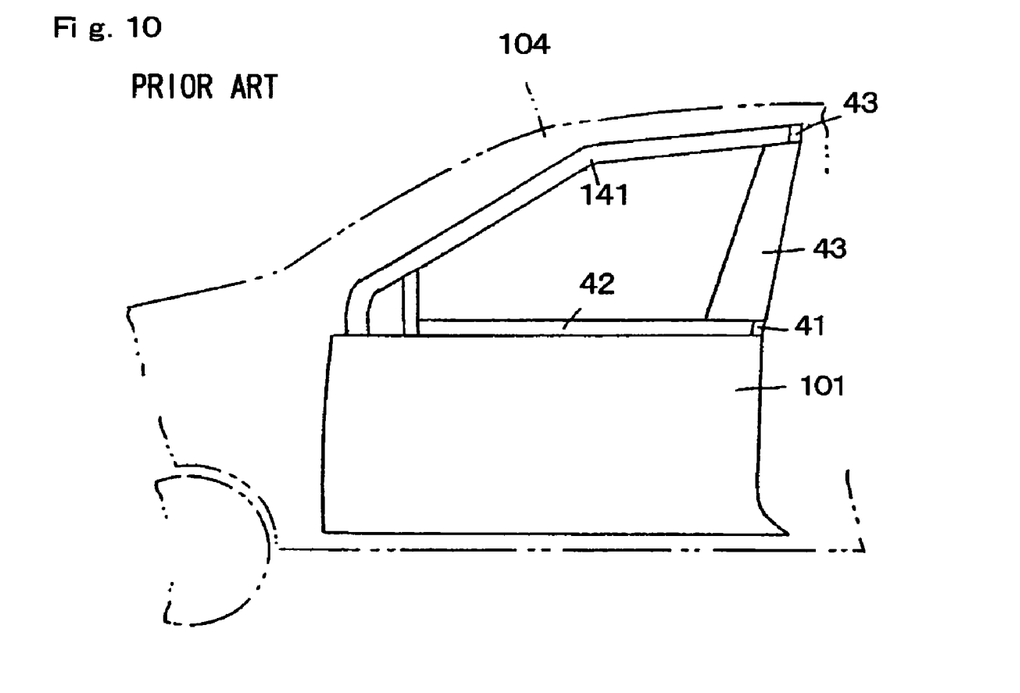
FIG. 10 is a side elevation view showing a mounting structure of an automobile door according to another prior art.
Figure 11:
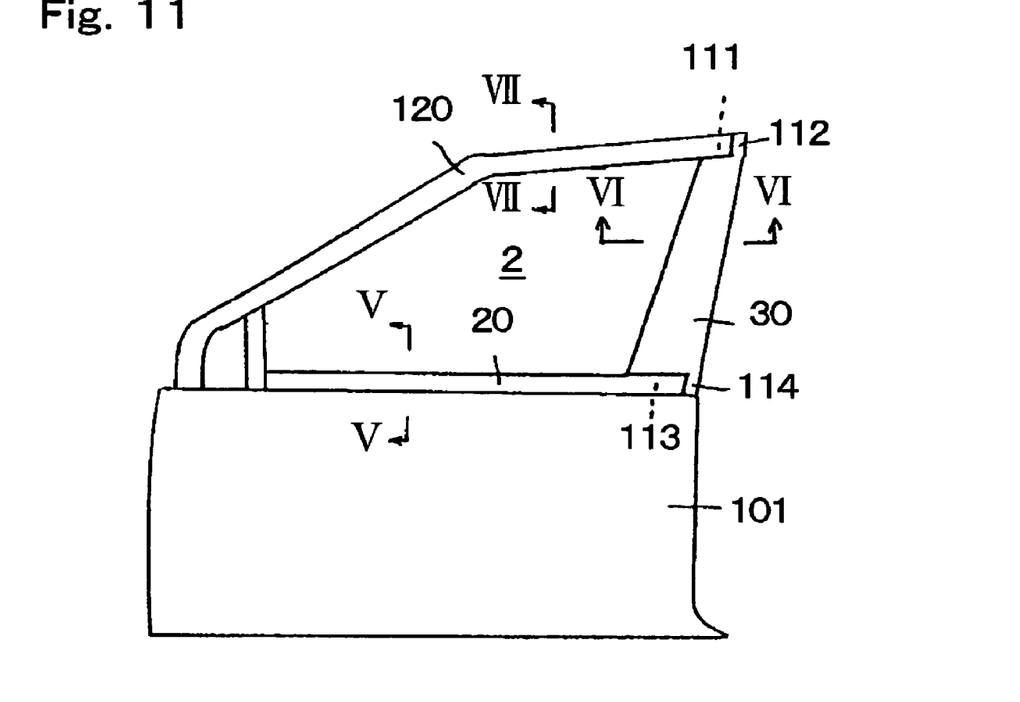
FIG. 11 is a side elevation view showing a mounting structure of an automobile door according to another preferred embodiment of the invention.
Figure 12:
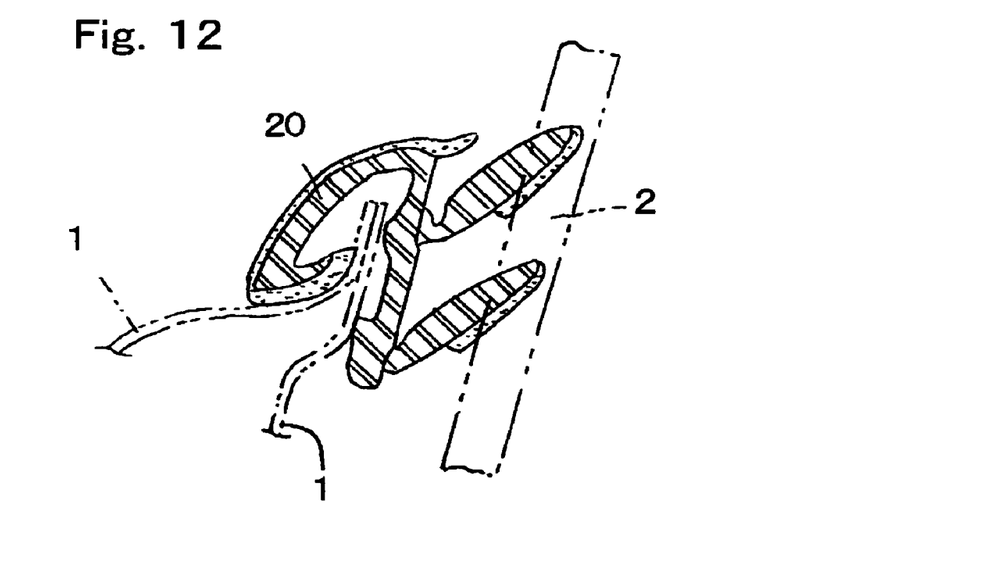
FIG. 12 is a section view along line V—V in FIG. 11.
Figure 13:
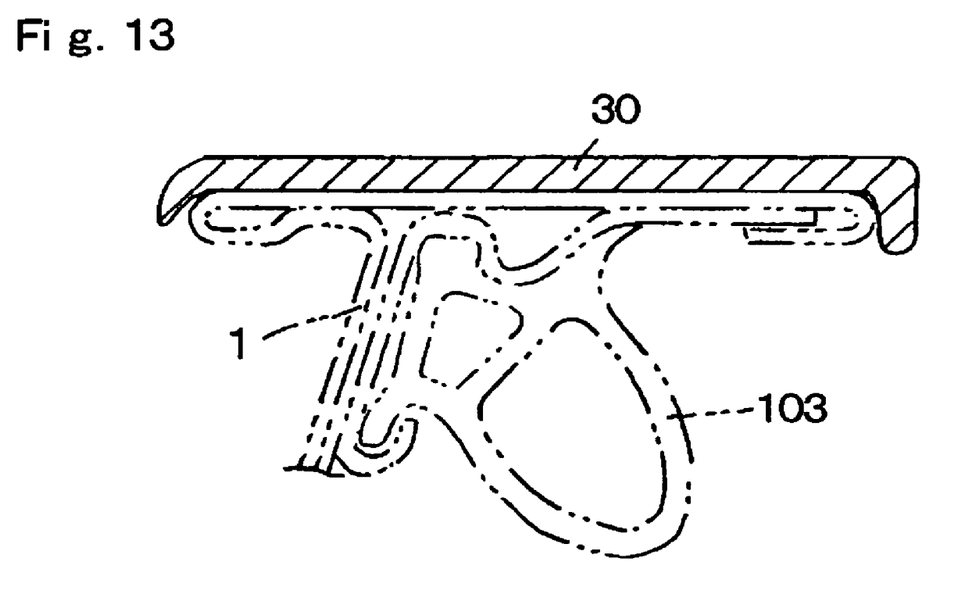
FIG. 13 is a section view along line VI—VI in FIG. 11.
Figure 14:
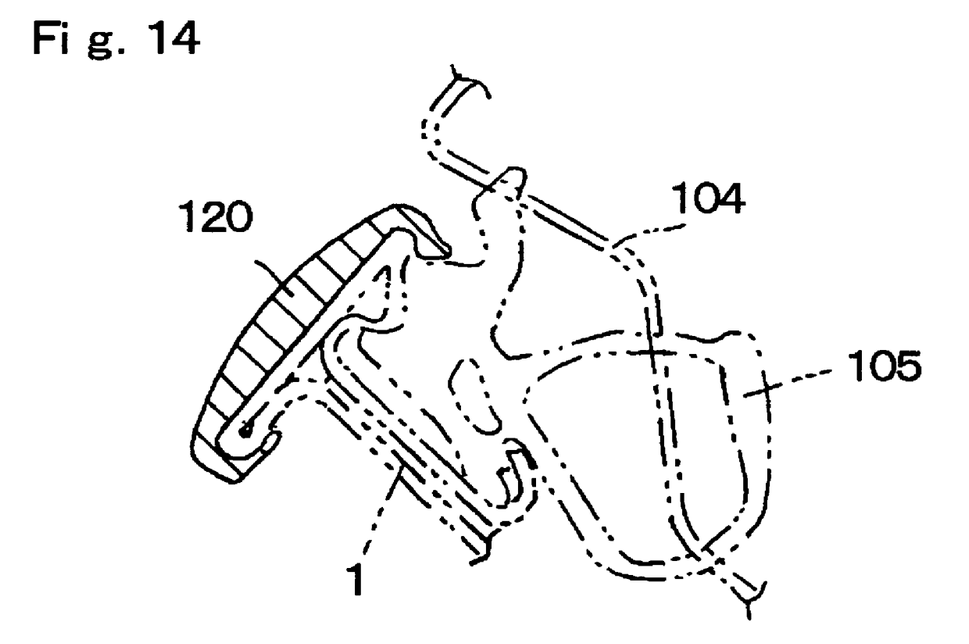
FIG. 14 is a section view along line VII—VII in FIG. 11.
Figure 15:
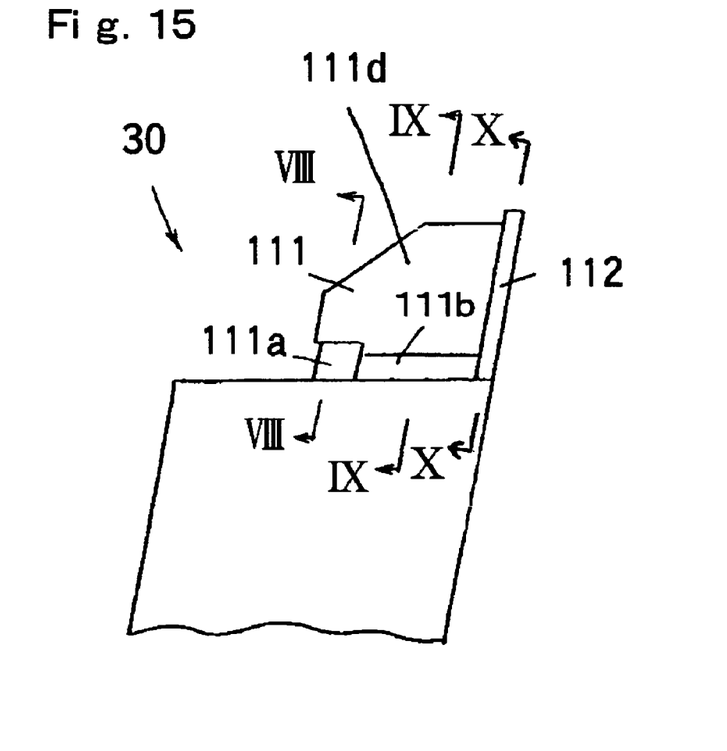
FIG. 15 is an enlarged view of an upper end portion of the member illustrated in FIG. 11.

Another prior art will be described referring to FIG. 10. There is provided an end cap 41 on both a rear end of a sash molding 141 installed to a roof side of an automobile door body 101 and a rear end of a belt line outer weather strip 42 in consideration of an appearance.

There is also anther prior art in which three members, a sash molding 141, a center pillar garnish 43 and a belt line outer weather strip 42, are integrally formed.

However, according to the former prior art in which the end cap 41 is applied, the end cap 41 is formed individually and is installed individually, so that a production cost increases and a mounting operation becomes troublesome.

According to the latter prior art wherein three members are integrally formed, it is required to operate a molding operation using a large sized injection machine, so that the production cost increases. Further, since three members are integrally molded, the degree of freedom in an entire shape of the combined structure is restricted, thus a change of design is difficult to accomplish. Moreover, when a molding member made of such as stainless is to be mounted to increase its appearance, such an extra mounting operation is required as a succeeding operation, so that the production cost further increases.

This invention is made in the light of those problems, and therefore, it is the second object of this invention to provide a mounting structure of an automobile door formed with a sash molding and a center pillar garnish, as well as a sash molding, a center pillar garnish and a belt line outer weather strip, which are inexpensive in a production cost.

SUMMARY OF THE INVENTION

A mounting structure of an automobile door according to the invention will be described hereinafter referring to FIGS. 3 to 9 and 11 to 18.

A mounting structure of an automobile door according to the first aspect of the invention is formed in a lower end of a center pillar portion 1a of the automobile door, wherein a rear end of a belt line outer weather strip 20 and a lower end of a center pillar garnish 30 are mounted on a door panel 1 through the intermediary of an end cap mechanism 10. The center pillar garnish 30 comprises a concave groove 31 in a lower end portion thereof. The concave groove 31 is wide opened in a down ward direction. The end cap mechanism 10 comprises a roughly U-shaped gripping groove 11 in an upper portion thereof and a clip portion 15 in a lower portion thereof. The gripping groove 11 of the end cap mechanism 10 holds a cut upper end portion 21 of the belt line outer weather strip and an upper concave groove portion 32 of the center pillar garnish 30 as well as an upper pass hole portion 1c of the center pillar portion 1a. The clip portion 15 is inserted into a mounting hole 1d of the door panel 1.

A mounting structure of an automobile door according to the second aspect of the invention comprises a gap 50 in the first aspect of the invention which is formed between a bottom surface of the gripping groove 11 and a lower end surface of the upper concave groove portion 32.

A mounting structure of an automobile door according to the third aspect of the invention comprises a center pillar garnish 30 installed to an automobile door body 101 and a sash molding 120. The center pillar garnish 30 comprises a supporting portion 111 in an upper end portion thereof, and a rear end portion of the sash molding 120 is overlayingly mounted on the supporting portion 111. The supporting portion 111 comprises a first end cap 112 in a rear end portion thereof. The first end cap 112 covers a rear end of the sash molding 120.

A mounting structure of an automobile door according to the fourth aspect of the invention comprises a center pillar garnish 30 installed to an automobile door body 101 and a belt line outer weather strip 20. The center pillar garnish 30 comprises a mounting portion 113 in a lower end portion thereof, and a lower end portion of the belt line outer weather strip 20 is overlayingly mounted on the mounting portion 113. The mounting portion 113 comprises a second end cap 114 in a rear end portion thereof. The mounting portion 113 covers a rear end of the belt line outer weather strip 20.

A mounting structure of an automobile door according to the fifth aspect of the invention comprises a center pillar garnish 30 installed to an automobile door body 101, sash molding 120 and belt line outer weather strip 20. The center pillar garnish 30 comprises a supporting portion 111 in an upper end portion thereof, and a rear end portion of the sash molding 120 is overlayingly mounted on the supporting portion. The supporting portion 111 comprises a first end cap 112 in a rear end portion thereof. The first end cap 112 covers a rear end of the sash molding 120. The center pillar garnish 30 comprises a mounting portion 113 in a lower end portion thereof, and a lower end portion of the belt line outer weather strip 20 is overlayingly mounted on the mounting portion 113. The mounting portion 113 comprises a second end cap 114 in a rear end portion thereof. The mounting portion 113 covers a rear end of the belt line outer weather strip 20.

A mounting structure of an automobile door according to the sixth aspect of the invention is that the supporting portion 111 as claimed in claim 3 comprises a sash molding intrusion plate 11d and a groove portion 111a or/and a hole portion 111b. The sash molding intrusion plate 11d connects to the first end cap 112 formed in an upper end portion of the center pillar garnish 30. The groove portion 111a or/and hole portion 111b are formed between the sash molding intrusion plate 11d and an upper end portion of the center pillar garnish 30.

A mounting structure of an automobile door according to the seventh aspect of the invention is that the supporting portion 111 as claimed in claim 5 comprises a sash molding intrusion plate 11d and a groove portion 111a or/and a hole portion 111b. The sash molding intrusion plate 11d connects to the first end cap 112 formed in an upper end portion of the center pillar garnish 30. The groove portion 111a or/and hole portion 111b are formed between the sash molding intrusion plate 11d and an upper end portion of the center pillar garnish 30.

A mounting structure of an automobile door according to the eighth aspect of the invention is that the mounting portion 113 as claimed in 4, which is formed in a lower end of the pillar garnish 30, comprises an engaging piece 113a and mounting piece 113b. The engaging piece 113a engages with a hole formed in a door panel 1, while the mounting piece 113b engages with a roughly U-shaped installing portion which is formed in the belt line outer weather strip 20.

A mounting structure of an automobile door according to the ninth aspect of the invention is that the mounting portion 113 as claimed in 5, which is formed in a lower end of the pillar garnish 30, comprises an engaging piece 113a and mounting piece 113b. The engaging piece 113a engages with a hole formed in a door panel 1, while the mounting piece 113b engages with a roughly U-shaped installing portion which is formed in the belt line outer weather strip 20.

According to the first aspect of the invention, the gripping grove 11 of the end cap mechanism 10 holds the cut upper end portion 21 of the belt line outer weather strip 20 and the upper concave groove portion 32 of the center pillar garnish 30 as well as the upper pass hole portion 1c of the center pillar portion 1a, while engaging the clip portion 15 with the mounting hole 1d of the door panel 1, so that the outlook of the structure will not deteriorate even if resin materials forming such as the center pillar garnish 30 and the end cap mechanism 10 shrink or expand because of a temperature variation.

Although each of the belt line outer weather strip 20, the center pillar garnish and the end cap mechanism 10 is individually formed, the end cap mechanism 10 holds the upper pass hole portion 1c of the center pillar portion 1a by the gripping groove 11 while installing the clip portion 15 to the mounting hole 1d of the door panel 1, so that the end cap mechanism 10 does not move in any of back and forth, up and down, and right and left.

Further, the center pillar garnish 30 is held by the gripping groove 11 of the end cap mechanism 10 at the upper concave groove portion 32, so that it does not move any direction as well. Moreover, the belt line outer weather strip 20 is held by the gripping groove 11 at the cut upper end portion 21 thereof, so that it does not move either right and left, or up and down. Further, the center pillar garnish 30 is prevented to move in front and back with an end cap portion 13 being formed at the rear end of the end cap mechanism 10, so that it does not move in any direction as well. Therefore, the outlook of the structure is well maintained.

According to the second aspect of the invention, the move of each member caused by the temperature variation is prevented in the same manner as in the first aspect of the invention. Further, there is provided the gap 50 between the bottom surface of the gripping groove 11 and the lower end surface of the upper concave groove portion 32, so that the move of each member caused by the temperature variation is more effectively prevented, and that in case the members are irregularly displaced, the gap 50 is able to absorb such displacement. Therefore, the outlook of the structure is further well maintained.

According to the third, fifth and sixth aspects of the invention, there is provided the supporting portion 111 in the upper end portion of the center pillar garnish 30, on which the rear end of the sash molding 120 is overlayingly mounted, and there is provided the first end cap 112 on the rear end of the supporting portion 111 to cover the rear end of the sash molding 120, so that, unlike the prior art, it is not required to mold and install the end cap individually. Therefore, the production cost can be reduced and the installation process can be simplified. It should be noted that the rear end of the sash molding 120 is covered by the first end cap 112, so that the appearance of the structure looks better.

According to the fourth, fifth and seventh aspects of the invention, there is provided the mounting portion 113 in the lower end of the center pillar garnish 30, on which the rear end portion of the belt line outer weather strip 20 is overlayingly mounted, and there is also provided the second end cap 114 in the rear end portion of the mounting portion 113 to cover the belt line outer weather strip 20, so that in combination of the sash molding 120, three individual members can be easily assembled after individually molding.

Therefore, it is unnecessary to use a large sized injection machine and thus the production cost can be kept low. Further, each member is formed individually, so that the degree of freedom in the shape of the whole structure improves and the change of design becomes easier. Moreover, a molding member made of stainless or the like can be easily installed. Therefore, the production cost can be reduced. It should be noted that the rear end of the belt line outer weather strip 20 is covered by the second end cap 114, so that the outlook of the structure looks better.

DETAILED DESCRIPTION OF THE INVENTION

Referring to FIGS. 3 to 9, a preferred embodiment of a mounting structure of an automobile door according to the invention will be described. The reference number "2" in FIG. 6 indicates a center pillar weather strip.

This embodiment is a mounting structure wherein a rear end of a belt line outer weather strip 20 and a lower end of a center pillar garnish 30 are mounted on a door panel 1 through the intermediary of an end cap mechanism 10, in a lower end portion of a center pillar portion 1a of a front door of an automobile. This mounting structure is assembled by mounting the integrally assembled three members—the belt line outer weather strip 20, the center pillar garnish 30 and the end cap mechanism 10—on a door panel 1 after assembling those three individual members into one unit.

The center pillar garnish 30 is installed to the center pillar portion 1a of the door panel 1. The center pillar garnish 30 is provided with a concave groove 31 in a lower end portion thereof, which opens in a downward direction. The end cap mechanism 10 comprises a lengthwise main body 12 and an end cap portion 13 in a rear end of the main body 12, as well as a roughly U-shaped gripping groove 11 in an upper middle of the main body 12 and a clip portion 15 below the gripping groove 11. The gripping groove 11 is formed with a combination of a back wall 11c, which forms a part of the main body 12, a bottom wall 11b and a front wall 11a.

The gripping groove 11 of the end cap mechanism 10 holds a cut upper end portion 21 of the belt line outer weather strip 20, an upper concave groove portion 32 of the center pillar garnish 30 and an upper pass hole portion 1c of the center pillar portion 1a. This mounting structure is formed by inserting the front wall 11a of the gripping groove 11 into an insert hole formed in the center pillar portion 1a after having the gripping groove 11 hold the cut upper end portion 21 and the upper concave groove portion 32.

Further, the clip portion 15 is inserted into a mounting hole 1d of the door panel 1, and an engaging portion 15a of the clip portion 15 is engaged with a periphery of the mounting hole 1d. Moreover, in this preferred embodiment, there is provided a gap 50 between a bottom surface of the gripping groove 11 and a lower end surface of the upper concave groove portion 32.

There is provided a mounting convex portion 14 in a front end of the main body 12 of the end cap mechanism 10. The front end of the main body 12 is pressingly inserted into an interior space of the belt line outer weather strip 20 to firmly assemble the end cap mechanism 10 and the belt line outer weather strip in a stabilized posture. Further, the cut upper end portion 21 of the belt line outer weather strip 20 is formed by cutting a contacting portion of a seal lip 22, which makes a resilient contact with a door glass 3.

According to the mounting structure of an automobile in the preferred embodiment of the invention, the gripping groove 11 of the end cap mechanism 10 holds the cut upper end portion 21 of the belt line outer weather strip 20 as well as the upper concave groove portion 32 of the center pillar garnish 30 while holding the upper pass hole 1c of the center pillar portion 1a by inserting the front wall 11a of the gripping groove 11 into the insert hole 1b, and further securing the clip portion 15 to the mounting hole 1d of the door panel, so that it enables to precisely install those members to the door panel 1 avoiding any displacement of the members. Therefore, in case resin materials forming the center pillar garnish 30 as well as the other members shrink or expand caused by a temperature variation, each member does not move from its proper position, so that the outlook of the structure is not deteriorated.

Further, according to this embodiment, the gap 50 is provided between the bottom surface of the gripping groove 11 and the lower end surface of the upper concave groove portion 32, so that in case the resin materials shrink or expand because of the temperature variation, or in case the members are irregularly displaced, the gap 50 absorbs the displacement without deteriorating an appearance of the structure. Therefore, an outlook of the structure can be maintained good.

Another preferred embodiment of a mounting structure of an automobile according to the invention will be described referring to FIGS. 11 to 18. This mounting structure comprises a center pillar garnish 30, which is installed to a door body 101 of an automobile, and a sash molding 120. There is provided a supporting portion 111 in an upper end portion of the center pillar garnish 30, on which a rear end portion of the sash molding 120 is overlayingly mounted. A first end cap 112 is provided in a rear end of the supporting portion 111, which covers a rear end portion of the sash molding 120.

Figure 16:
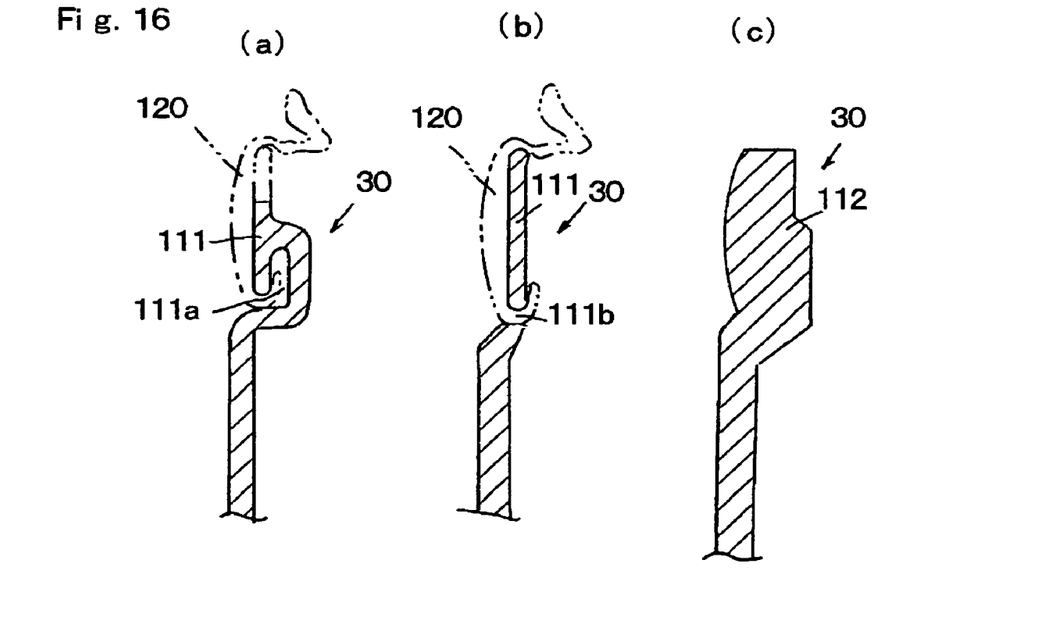
FIG. 16 is a section view of the member illustrated in FIG. 15, wherein (a) shows a view along line VIII—VIII, (b) shows a view along line IX—IX, and (c) shows a view along line X—X.

The sash molding 120 is installed to the center pillar garnish 30 as illustrated in FIG. 16, (a), (b), that the sash molding 120 is formed in roughly "C" shape in section, and an upper end portion thereof is engaged with an upper end portion of the center pillar garnish 30, while a lower end the sash molding 120 is engaged with a groove portion 111a and a hole portion 111b formed in the center pillar garnish 30. In the drawings, the numeral "3" indicates a door glass, "103" is a center pillar side weather strip, "104" is a body panel and "105" indicates a roof side weather strip.

It should be noted that it is preferable to comprise both the groove portion 111a and the hole portion 111b because in case only a groove portion 111a is provided, the man-hour increases in removing a center pillar garnish 30 out of a die after completion of a die molding, and in case only a hole portion 111b is provided, a sash molding intrusion plate 111d would not be held as firmly as it should be.

According to the above-mentioned mounting structure, without individually forming an end cap, the rear end portion of the sash molding 120 is mounted on the upper end portion the center pillar garnish 30, and the rear end of the sash molding 120 is covered by the first end cap 112, so that the production cost can be reduced and that a mounting operation can be simplified. Further, an outlook of the structure is maintained good by a function of the first end cap 112.

A mounting structure of an automobile door according to the invention may be formed in the following manner. That is, in a mounting structure of a center pillar garnish 30, which is installed to a door body 101 of an automobile, a sash molding 120 and a belt line outer weather strip 20, there is provided a supporting portion 111 in an upper end portion of the center pillar garnish 30, on which a rear end portion of the sash molding 120 is overlayingly mounted, and there is also provided a first end cap 112 in a rear end of the supporting portion 111, which covers a rear end of the sash molding 120.

With this structure, without individually forming an end cap, the rear end portion of the sash molding 120 can be mounted on the upper end portion of the center pillar garnish 30, and the rear end of the sash molding 120 can be covered by the first end cap 112. Therefore, the production cost can be reduced, and the installation operation can be simplified. Further, an outlook of the structure looks better.

Figure 17:
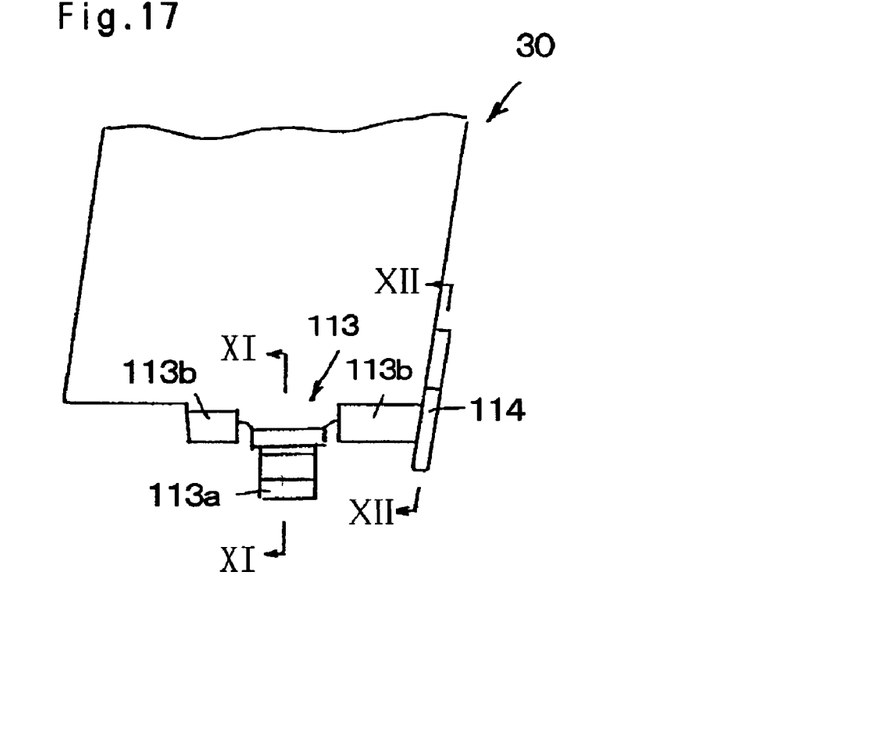
FIG. 17 is an enlarged view of a lower end portion of the member illustrated in FIG. 11.
Figure 18:
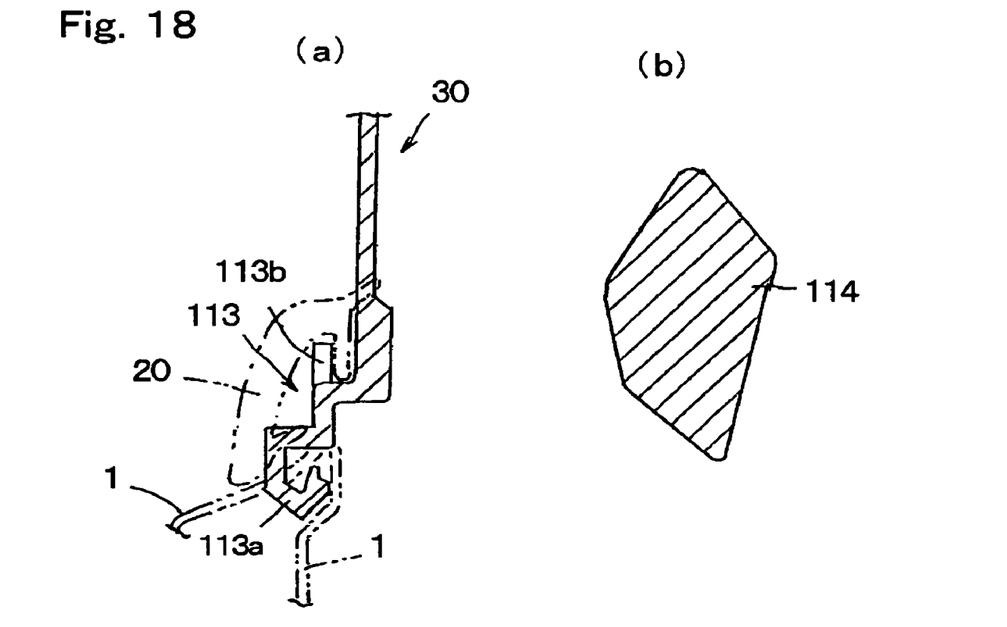
FIG. 18 is a section view of the member illustrated in FIG. 17, wherein (a) shows a view along line XI—XI, and (b) shows a view along line XII—XII.

Further, in addition to the above mentioned structure, there is provided a mounting portion 113 in a lower end of the center pillar garnish 30, on which a rear end portion of the belt line outer weather strip 20 is overlayingly mounted, and there is also provided a second end cap 114 in a rear end of the mounting portion 113 to cover a rear end of the belt line outer weather strip 20. The mounting portion 113 is provided with an engaging piece 113*a* to install the center pillar garnish 30 to the door panel 1. The mounting portion 13 is also provided with a mounting piece 113*b* to install the belt line weather strip 20 to the center pillar garnish 30.

With this structure, those three members—the center pillar garnish 30, the sash molding 120 and the belt line outer weather strip 20—can be easily installed after forming each member individually, so that a large scaled injection machine is unneeded. Therefore, the production cost can be reduced.

Further, each member is molded individually, so that the degree of freedom in a combined structure increases, and the change of design becomes easier. Moreover, a molding material such as a stainless can be installed without difficulty. Therefore, the production cost can be reduced. Further, the rear end of the belt line outer weather strip 20 is covered by the second end cap 114, so that an outlook of the structure looks better.

The disclosure of Japanese Patent Application No. 2004-051019 field Feb. 26, 2004 and No. 2004-069298 field Mar. 11, 2004 including specification, claims, and drawings, is incorporated herein by reference.

What is claimed is:

1. A mounting structure of an automobile door formed in a lower end of a center pillar portion of the automobile door in which a rear end of a belt line outer weather strip and a lower end of a center pillar garnish are mounted on a door panel through the intermediary of an end cap mechanism wherein, said center pillar garnish comprises a concave groove in a lower end portion thereof;

said concave groove is wide opened in a down ward direction;

said end cap mechanism comprises a roughly U-shaped gripping groove in an upper portion thereof and a clip portion in a lower portion thereof;

said gripping groove of said end cap mechanism holds a cut upper end portion of said belt line outer weather strip and an upper concave groove portion of said center pillar garnish as well as an upper pass hole portion of said center pillar portion; and said clip portion is inserted into a mounting hole of said door panel.

2. A mounting structure of an automobile door claimed in claim 1, wherein a gap is formed between a bottom surface of said gripping groove and a lower end surface of said upper concave groove portion.

3. A mounting structure of an automobile door comprising a center pillar garnish installed to an automobile door body and a sash molding wherein, said center pillar garnish comprises a supporting portion in an upper end portion thereof;

a rear end portion of said sash molding is overlayingly mounted on said supporting portion;

said supporting portion comprises an end cap in a rear end portion thereof; and said end cap covers a rear end of said sash molding.

4. A mounting structure of an automobile door comprising a center pillar garnish installed to an automobile door body and a belt line outer weather strip wherein, said center pillar garnish comprises a mounting portion in a lower end portion thereof;

a lower end portion of said belt line outer weather strip is overlayingly mounted on said mounting portion;

said mounting portion comprises an end cap in a rear end portion thereof; and said mounting portion covers a rear end of said belt line outer weather strip.

5. A mounting structure of an automobile door comprising a center pillar garnish installed to an automobile door body, sash molding and belt line outer weather strip wherein, said center pillar garnish comprises a supporting portion in an upper end portion thereof;

a rear end portion of said sash molding is overlayingly mounted on said supporting portion;

said supporting portion comprises a first end cap in a rear end portion thereof;

said first end cap covers a rear end of said sash molding;

said center pillar garnish comprises a mounting portion in a lower end portion thereof;

a lower end portion of said belt line outer weather strip is overlayingly mounted on said mounting portion;

said mounting portion comprises a second end cap in a rear end portion thereof; and said mounting portion covers a rear end of said belt line outer weather strip.

6. A mounting structure of an automobile door claimed in claim 3 wherein, said supporting portion comprises a sash molding intrusion plate and a groove portion or/and a hole portion;

said sash molding intrusion plate connects to said first end cap formed in an upper end portion of said center pillar garnish; and said groove portion or/and hole portion is/are formed between said sash molding intrusion plate and an upper end portion of said center pillar garnish.

7. A mounting structure of an automobile door claimed in claim 5 wherein, said supporting portion comprises a sash molding intrusion plate and a groove portion or/and a hole portion;

said sash molding intrusion plate connects to said first end cap formed in an upper end portion of said center pillar garnish; and said groove portion or/and hole portion is/are formed between said sash molding intrusion plate and an upper end portion of said center pillar garnish.

8. A mounting structure of an automobile door claimed in claim 4 wherein,
said mounting portion comprised in a lower end of said center pillar garnish comprises an engaging piece and mounting piece;
said engaging piece engages with a hole formed in a door panel; and
said mounting piece engages with a roughly U-shaped installing portion formed in said belt line outer weather strip.

9. A mounting structure of an automobile door claimed in claim 5 wherein,
said mounting portion comprised in a lower end of said center pillar garnish comprises an engaging piece and mounting piece;
said engaging piece engages with a hole formed in a door panel; and
said mounting piece engages with a roughly U-shaped installing portion formed in said belt line outer weather strip.

* * * * *